UNITED STATES PATENT OFFICE.

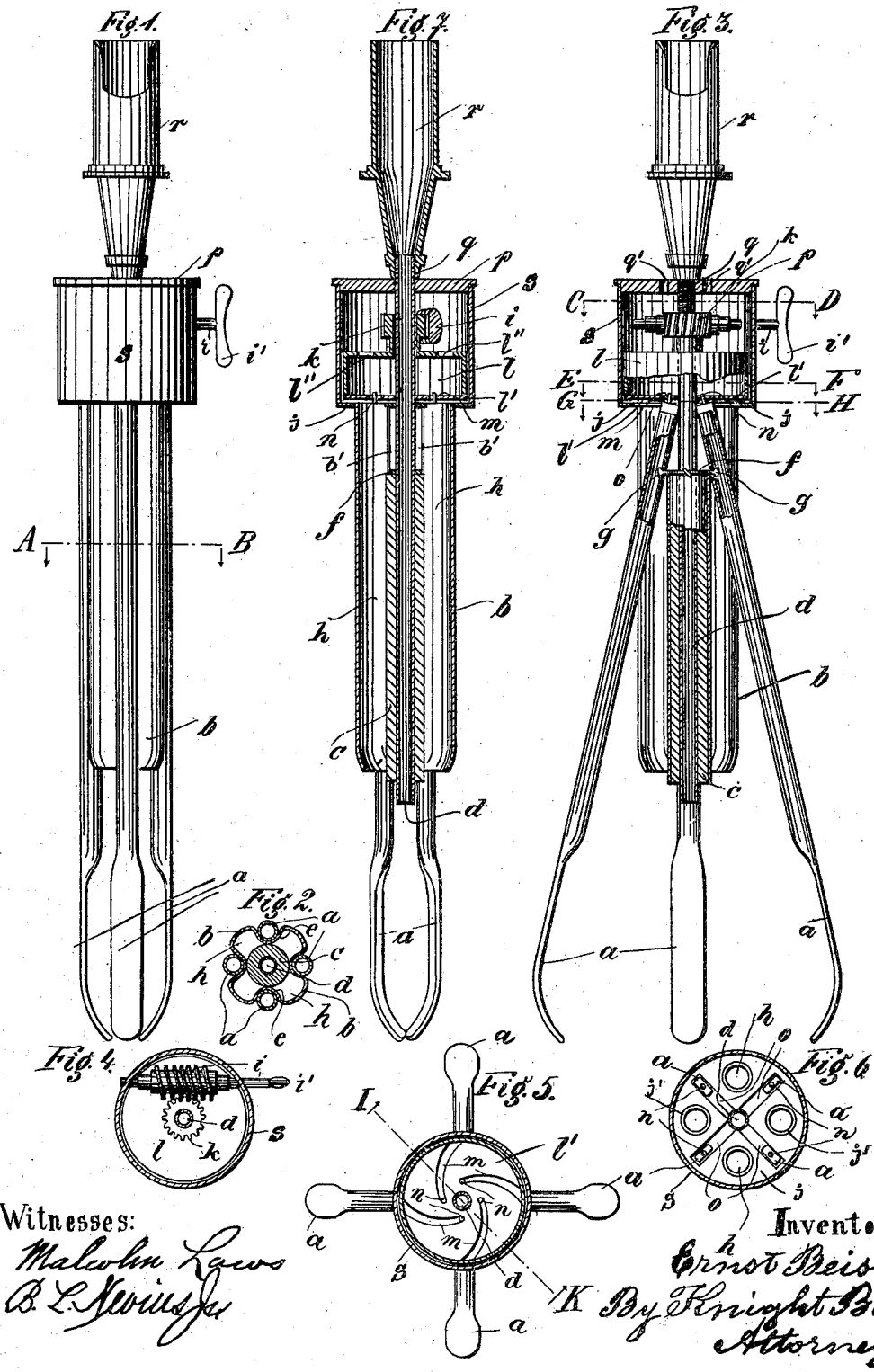

ERNST BEIST, OF MAGDEBURG, GERMANY.

DILATOR.

SPECIFICATION forming part of Letters Patent No. 708,452, dated September 2, 1902.

Application filed July 1, 1902. Serial No. 113,921. (No model.)

*To all whom it may concern:*

Be it known that I, ERNST BEIST, a subject of the Emperor of Germany and King of Prussia, and a resident of Magdeburg, in the Kingdom of Prussia and Empire of Germany, have invented certain new and useful Improvements in Dilators, of which the following is a specification.

My invention is an improvement on those devices which are employed for the purpose of dilating or expanding the rectum or vagina and injecting thereinto material either solid or liquid, or both combined, for cleansing the same, and particularly to those devices which comprise a tubular casing, an injecting-tube, pivoted arms, and means whereby the arms are opened and closed.

My improvements consist in novel features of construction whereby the utility of such devices is greatly enhanced, as hereinafter described and claimed.

In order that my invention may be fully understood, I will proceed to describe it with reference to the accompanying drawings, in which—

Figure 1 is a front elevation of my improved dilator, the arms being closed. Fig. 2 is a transverse section taken on the line A B of Fig. 1. Fig. 3 is in part a front elevation and in part a longitudinal section, the arms being open. Fig. 4 is a transverse section taken on the line C D of Fig. 3. Fig. 5 is a transverse section taken on the line E F of Fig. 3. Fig. 6 is a transverse section taken on the line G H of Fig. 3. Fig. 7 is a longitudinal section taken on the line I K of Fig. 5.

The apparatus is constructed with a tubular casing or body $b$, grooved or corrugated, so as to provide longitudinal recesses $e$ on the exterior wall thereof and longitudinal air-passages $h$ on the interior wall of the same. This tubular casing is provided with a cylindrical head $s$, having an inner plate $j$, to which the tubular casing is secured, and an outer plate $p$, seating on the cylindrical head $s$. Within the tubular casing $b$ is arranged an intermediate sleeve $c$, at the inner end of which is located a perforated disk or ring $f$.

$d$ is an injecting-tube extending entirely through the head and sleeve to a point just beyond the outer end of the sleeve and provided with a screw-threaded outer end, whereby it is connected with the outer plate $p$ of the head and projecting therebeyond to receive the mouth or coupling piece $r$ of the device.

$l$ is a drum loosely mounted on the tube $d$ within the cylindrical head and formed with a worm-wheel $k$ at its outer end, which is meshed by a worm-gear formed on a transverse shaft $i$, journaled in the cylindrical head and provided with an operating-handle $i'$, whereby the drum is oscillated for a purpose hereinafter described.

$a$ represents movable arms, having their inner parts resting normally within the longitudinal recesses $e$ of the tubular casing, so as to be confined in closed position within the diameter of the tubular casing, while their outer parts extend a considerable distance beyond the outer end of the tubular casing. As a means for opening and closing these arms I provide the following-described connections with the tubular casing, cylindrical head, and drum. The inner end of the tubular casing within the recesses $e$ is provided with longitudinal slots $b'$, into which the inner ends of the arms may project until they impinge against the injecting-tube, which limits their inward movement. The inner ends of the arms have transverse slots, into which the peripheral edge of the disk is received, and the arms are pivotally coupled to the disk by means of headed pins $g$. The inner plate $j$ of the cylindrical head is formed with radial guide-slots $o$ to receive guide-pins $n$, secured to the inner ends of the arms for guiding the latter in their movement. These guide-pins are of sufficient length to project farther into curved slots $m$, formed in the inner plate $l'$ of the drum $l$, so that when the drum is oscillated in the proper direction the walls of the curved slots bear against the guide-pins, so that the arms are tilted inwardly at their inner ends and spread outwardly at their free ends to open them and returned to normal position to seat them in the longitudinal recesses. To permit the air to pass freely through the longitudinal passages $h$, the inner plate of the cylindrical head is formed with openings $j'$ in line therewith, the outer plate of the drum with openings $l''$, and the outer plate $q$ of the cylindrical head with openings $q'$.

It will be observed that when the arms are closed they are in such a position as to be located within the circumference of the tubular casing, while the outer parts of the arms project beyond the tubular casing and meet at their inwardly-curved extremities, so that a rounded relatively smooth surface is provided on the device, thus avoiding projecting surfaces, which might injure the wall of the opening.

While the tubular casing is adapted to enter the outer part of an opening, the arms projecting beyond the casing are adapted to extend to a farther point at the inner part of the opening and the whole opening is expanded gradually when the arms are opened in operating the dilating mechanism.

The air-passages provided through the device avoid any excess of pressure within the opening.

The pivots of the arms are located in such a position that the outer part of the opening is only slightly expanded, and the pivots being isolated from the surface of the casing there is no liability of their contact with the coating of the outer part of the opening to the injury of the latter.

Having thus described my invention, the following is what I claim as new therein and desire to secure by Letters Patent:

1. A dilator comprising a tubular casing having exterior grooves providing longitudinal recesses on its outer side, the arms pivoted to the casing so as to seat in the recess within the circumference of the casing and provide a relatively smooth surface, and means for opening and closing the arms.

2. A dilator comprising a corrugated tubular casing having interior and exterior grooves providing longitudinal air-passages on its inner side and longitudinal recesses on its outer side, the arms pivoted to the casing so as to seat in the recesses within the circumference of the casing and provide a relatively smooth surface, and means for opening and closing the arms.

3. A dilator comprising an interiorly and exteriorly grooved tubular casing providing longitudinal air-passages on its inner side and longitudinal recesses on its outer side, the arms pivoted to the casing so as to seat within the recesses and extending beyond the casing and means for opening and closing the arms.

4. A dilator comprising an interiorly and exteriorly grooved tubular casing providing longitudinal air-passages on its inner side and longitudinal recesses on its outer side, the arms pivoted to the casing so as to seat within the recesses, the intermediate sleeve fitted within the casing, the injecting-tube fitted within the intermediate sleeve, and means for opening and closing the arms.

5. A dilator comprising an interiorly and exteriorly grooved tubular casing providing longitudinal air-passages on its inner side and longitudinal recesses on its outer side, the arms, the disk located within the casing having headed pins extending through the casing whereby the arms are pivoted to the casing at their inner ends so as to seat within the recesses, and means for opening and closing the arms.

6. A dilator comprising an interiorly and exteriorly grooved tubular casing providing longitudinal air-passages on its inner side and longitudinal recesses on its outer side, having longitudinal slots at their inner ends, the arms pivoted to the casing so as to seat within the recesses and adapted to enter the longitudinal slots at their inner ends, and means for opening and closing the arms.

7. A dilator comprising a grooved tubular casing providing longitudinal air-passages on its inner side and longitudinal recesses on its outer side, the arms pivoted to the casing within the recesses, having guide-pins at their inner ends, the head to which the casing is secured, the drum located within the head, having a worm-wheel, and an inner plate formed with curved slots which receive the guide-pins, and a shaft mounted in the head having a worm-gear whereby the worm-wheel is oscillated to operate the drum which in turn rotates the inner plate thereof for opening and closing the arms.

8. A dilator comprising a grooved tubular casing providing longitudinal air-passages on its inner side and longitudinal recesses on its outer side, the arms pivoted to the casing within the recesses, and having guide-pins at their inner ends, the head to which the casing is secured, having an inner plate formed with radial guide-slots through which the guide-pins project, the drum, located within the head, having a worm-wheel, and an inner plate formed with curved slots which receive the guide-pins, and a shaft mounted in the head having a worm-gear whereby the worm-wheel is oscillated to operate the drum which in turn rotates the inner plate thereof for opening and closing the arms.

9. A dilator comprising a grooved tubular casing providing longitudinal air-passages on its inner side and longitudinal recesses on its outer side, having longitudinal slots at their inner ends, the arms having guide-pins at their inner ends and seating in the recesses and adapted to enter the longitudinal slots at their inner ends, the disk having headed pins whereby the arms are pivoted to the casing within the recesses at their inner ends, the head to which the casing is secured, having an inner plate formed with radial guide-slots through which the guide-pins project, the drum, located within the head, having a worm-wheel, and an inner plate formed with curved slots which receive the guide-pins, and a shaft mounted in the head having a worm-gear whereby the worm-wheel is oscillated to operate the drum which in turn rotates the inner plate thereof for opening and closing the arms.

10. A dilator comprising a grooved tubular casing providing longitudinal air-passages on its inner side and longitudinal recesses on its outer side, the arms having guide-pins at their inner ends, and seating in the recesses, the disk having headed pins whereby the arms are pivoted to the casing within the recesses, at their inner ends, the head to which the casing is secured, having an outer plate formed with air-openings and an inner plate formed with air-openings and radial guide-slots through which the guide-pins project, the drum having an outer plate formed with air-openings and a worm-wheel, and an inner plate formed with curved slots which receive the guide-pins, and shaft mounted in the head having a worm whereby the worm-wheel is oscillated to operate the drum which in turn rotates the inner plate thereof for opening and closing the arms.

ERNST BEIST.

Witnesses:
GUSTAV BEIST,
FR. BEIST.